US007489633B2

(12) United States Patent
Garakani et al.

(10) Patent No.: US 7,489,633 B2
(45) Date of Patent: Feb. 10, 2009

(54) METHOD AND APPARATUS FOR DIFFERENTIAL LINK BRING-UP FOR MOIP ON THE INTERNET

(75) Inventors: Mehryar Khalili Garakani, Westlake Village, CA (US); Herbert M. Wildfeuer, Santa Barbara, CA (US)

(73) Assignee: Cisco Technology Inc., San Jose, CA (US)

( * ) Notice: Subject to any disclaimer, the term of this patent is extended or adjusted under 35 U.S.C. 154(b) by 1235 days.

(21) Appl. No.: 10/255,168

(22) Filed: Sep. 24, 2002

(65) Prior Publication Data

US 2004/0059823 A1    Mar. 25, 2004

(51) Int. Cl.
*H04L 12/12* (2006.01)
(52) U.S. Cl. ...................... 370/231; 375/222
(58) Field of Classification Search ................. 370/230, 370/230.1, 231, 235; 375/22, 220–222; 709/227, 709/228, 230, 237
See application file for complete search history.

(56) References Cited

U.S. PATENT DOCUMENTS

| 5,384,780 | A | * | 1/1995 | Lomp et al. | 370/238 |
| 5,852,631 | A | * | 12/1998 | Scott | 375/222 |
| 6,757,250 | B1 | * | 6/2004 | Fayad et al. | 370/235.1 |
| 6,865,220 | B2 | * | 3/2005 | Abrishami | 375/220 |
| 6,898,181 | B1 | * | 5/2005 | Rasanen | 370/231 |
| 7,075,979 | B2 | * | 7/2006 | Beadle et al. | 375/222 |
| 7,113,501 | B2 | * | 9/2006 | Garakani et al. | 370/352 |
| 7,126,711 | B2 | * | 10/2006 | Fruth | 358/1.15 |
| 7,177,944 | B1 | * | 2/2007 | Chen et al. | 709/237 |
| 2002/0064168 | A1 | | 5/2002 | Garakani et al. | 370/410 |
| 2003/0123466 | A1 | * | 7/2003 | Somekh et al. | 370/401 |

FOREIGN PATENT DOCUMENTS

| EP | 1047231 A2 | 10/2000 |
| EP | 1209853 A1 | 5/2002 |
| WO | WO 01/01654 A2 | 1/2001 |

OTHER PUBLICATIONS

ITU V.42; Error-Correcting Procedures for DECS Using Asynchronous-to-Synchronous Conversion; 59 pages; Apr. 2002.

* cited by examiner

*Primary Examiner*—Wing F Chan
*Assistant Examiner*—Duc T Duong
(74) *Attorney, Agent, or Firm*—Stolowitz Ford Cowger LLP (57) ABSTRACT

Method and apparatus are described for differential MoIP bring-up and compression negotiation. A first differential, and, more particularly, overlapping, bring-up method involves initiating a bring-up of a first layer associated with a first modem; imposing a time delay; after the time delay, initiating a bring-up of a second layer associated with a second modem; and delaying completion of the first layer bring-up associated with the first modem until substantial completion of the second layer bring-up associated with the second modem. Two alternative differential, and, more particularly, sequential, V.8 modem relay link bring-up methods involve first bringing up a physical layer at a first leg while delaying bring-up of the physical layer of the second leg until completion of the bring up of the physical layer at the first leg, and thereafter completing XID exchange. All described methods and apparatus involve at least physical layer bring-up at both ends, and all optionally may involve the bring-up at either end also of error-correction (EC) layers and data compression layers.

34 Claims, 6 Drawing Sheets

METHOD AND APPARATUS FOR DIFFERENTIAL LINK BRING-UP FOR MOIP ON THE INTERNET

BACKGROUND OF THE INVENTION

The present invention relates generally to voice frame network systems such as Voice-Modem over Internet Protocol (MoIP) systems for concurrently carrying both voice and data signals, and more particularly it concerns method and apparatus for MoIP physical and link (error-correction) layer bring-up and compression layer negotiation.

SUMMARY OF THE INVENTION

Method and apparatus are described for differential MoIP bring-up and compression negotiation. A first differential, and, more particularly, overlapping, bring-up method involves initiating a bring-up of a first layer associated with a first modem; imposing a time delay; after the time delay, initiating a bring-up of a second layer associated with a second modem; and delaying completion of the first layer bring-up associated with the first modem until substantial completion of the second layer bring-up associated with the second modem. Two alternative differential, and, more particularly, sequential, V.8 modem relay link bring-up methods involve first bringing up a physical layer at a first leg while delaying bring-up of the physical layer of the second leg until completion of the bring up of the physical layer at the first leg, and thereafter completing XID exchange. All described methods and apparatus involve at least physical layer bring-up at both ends, and all optionally may involve the bring-up at either end also of error-correction (EC) layers and data compression layers.

DETAILED DESCRIPTION OF THE INVENTION

Figure 1:
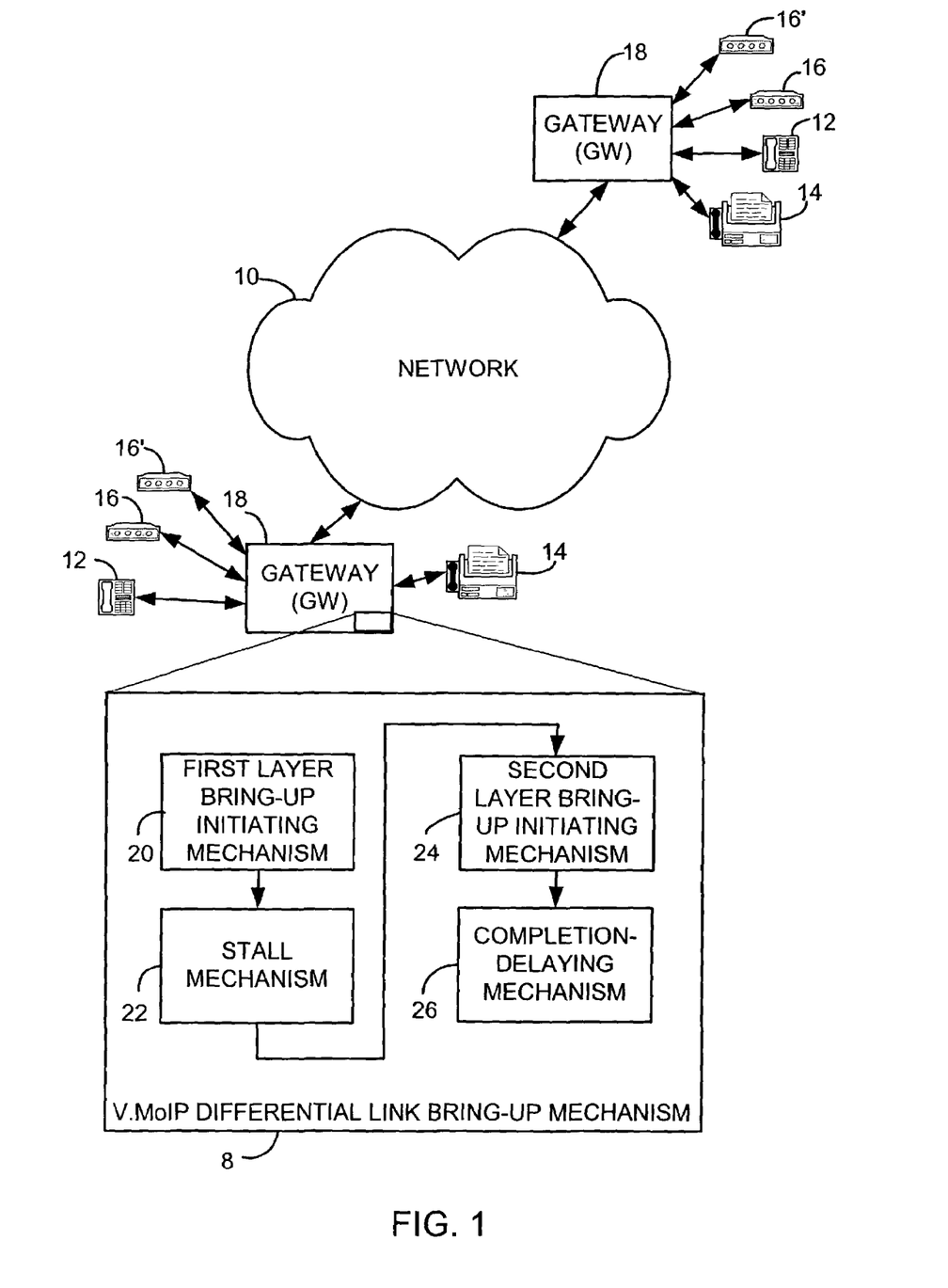
FIG. 1 is a system block diagram including the invented apparatus in accordance with a first embodiment.

FIG. 1 illustrates the invented apparatus 8 coupled with a network 10 operating with respect to voice traffic thereon in accordance with a voice and data packet protocol such as a Voice-Modem over Internet Protocol (MoIP) protocol. Network 10 typically includes one or more telephone handsets 12, one or more fax machines 14 and one or more low-speed modems 16 representing different traffic demands on network 10 due to their diverse bandwidth requirements. The faxes 14 and low-speed modems 16 often share telephone numbers with the telephone handsets to provide facsimile, e-mail and Internet service to users/clients. High-speed modems 16' having data rates of 32 k-56 kbits/second (kbps) or higher are typically provided, and are the type of high-speed modems with which the invention finds particular utility.

Handsets 12 communicating voice typically require bit rates of approximately 8 k-64 kbps over the IP network. Typically, plural handsets 12 are connected with each one of plural voice gateways 18 representing so-called endpoint nodes within network 10. Handsets 12 will be understood to be used for voice communication, whereby voice signals are digitized, packetized and transmitted bi-directionally during a telephone conversation. In a voice frame network like network 10, concurrent with voice traffic over the network is the presence of an increasing volume of data traffic.

Those of skill in the art will appreciate that data and voice traffic are compatible to some extent because both are represented in network 10 in digital form. But voice and data traffic have different requirements, especially under increasing traffic demands. For example, voice traffic requires low latency because of the need for immediate feedback or other form of acknowledgement in a two-way human conversation. In voice mode, MoIP channels using RTP or other low-latency protocols represent an unreliable transport for high-speed signaling between high-speed modems 16'. Conventionally, in a MoIP network 10, high-speed modems 16' would have negotiated an end-to-end physical layer, e.g. V.34, and gateways 18 would have been passive enablers of the resulting voice mode MoIP connection which is subject to high packet drop rates and frequent retrains.

The invented method and apparatus allow MoIP error-correction layer gateways to achieve end-to-end compression without requiring either call leg to be dropped and reestablished (redialed). This provides support in V.44 compression cases on MoIP gateways that do not have trans-compression capability or in no-compression V.14 cases used in gaming.

DEFINITIONS

Two new terms, "Voice Band Data", and "Modem Relay" are defined herein.

"Voice Band Data" (VBD) refers to transport of modem or fax signals over a voice channel using Real-time Transfer Protocol (RTP) with an encoding appropriate for modem or fax signals. This refers to Scenario Type "0" MoIP.

"Modem Relay" (MR) refers to all other MoIP schemes, which require termination of the physical layer and error-compression layer on the gateway (as a minimum) and may also require termination of the compression layer in one or both directions. Generally, MR relates to transporting modem traffic over a packet network by demodulating the modem signals at the Originating Gateway, carrying the data as IP packets and remodulating the data into modem signals at the Terminating Gateway.

One object of this invention is to provide a method for transition into modem relay for V.8 modems. The method allows gateways to support V.8 modem connections over modem relay and to support non-V.8 modems over VBD. Those of skill in the art will appreciate that V.8 modems include V.34, V.90, and V.92 modulations.

The advantage of modem relay over VBD is modem relay's resistance to network impairments and its more efficient use of bandwidth. However, for many applications, V.8 modem relay can cover much of the problem space, and the non-V.8 traffic can be handled using standard VBD fallback (with or without Forward Error Correction (FEC)). Furthermore, there are a number of considerations at lower speed modulations (e.g., V.18, V.21, V.22, V.22 bis) arguing that a VBD approach may be better suited at these lower speed modulations. See *Issues with Modem Relay for non-V42 Application Environments*, M. Garakani, H. Wildfeuer, Cisco Systems; Contribution PCM01-040 October 2001 ITU SG 16, Q11 Rapporteurs Meeting in Dublin, Ireland. See also *Modem Transport Over IP Using SPRT*, H. Wildfeuer, M. Garakani, Cisco Systems; Contribution PCM01-006 January 2001 ITU SG 16, Q11 Rapporteurs Meeting in Las Vegas, Nev., USA.

V.8 Modem Relay

Figure 2:
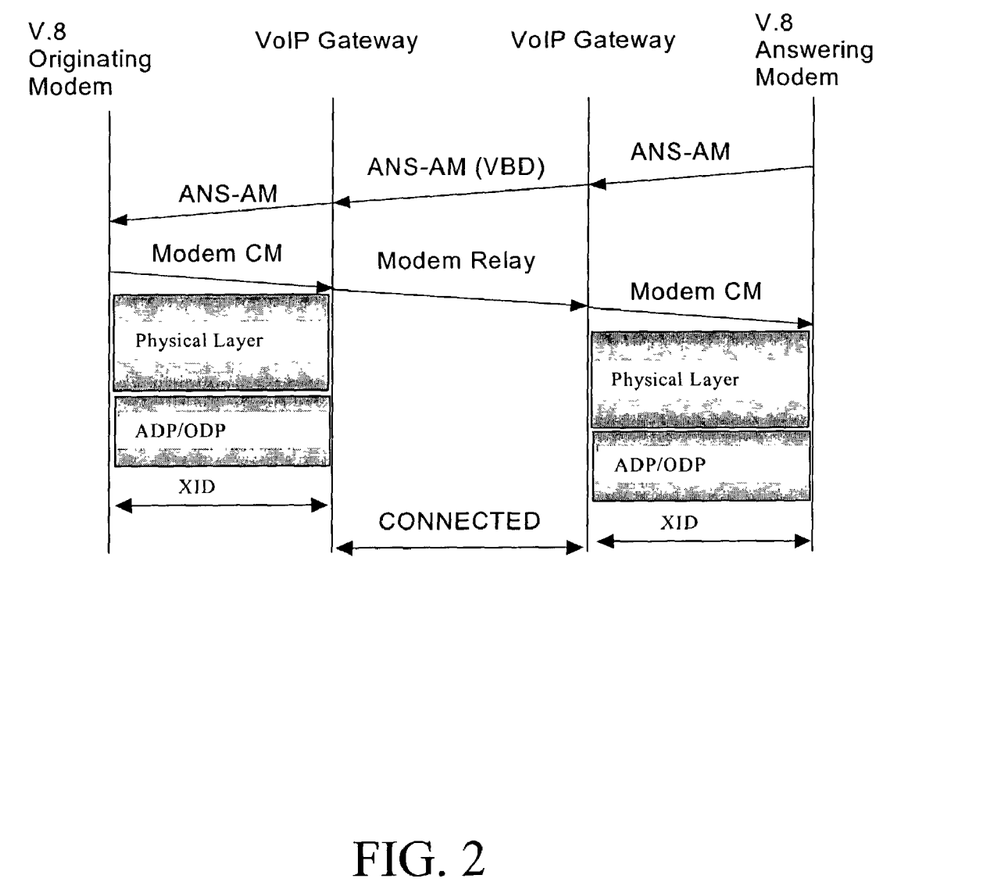
FIG. 2 is a flow diagram of a conventional method involving local XID parameter exchange.

FIG. 2 is a call flow diagram for "V.8 Modem Relay."

The procedure for V.8 modem relay may be as follows:
1. Terminating Gateway detects ANSAm and switches over to VBD.
2. ANSAm signal is carried over VBD to the Originating Gateway, which switches over to VBD and sends ANSAm to Originating Client modem.
3. Originating Client modem responds with "modem call menu (CM)" (i.e., CM patterns indicating a data modem).
4. Originating Gateway detects "modem CM".
5. Originating Gateway sends event to Terminating Gateway indicating "modem CM" has been detected. Originating Gateway proceeds to bring-up of physical layer, local ADP/ODP negotiation, and local XID exchange.
6. Terminating Gateway brings up physical layer (starting with CM generation). It then proceeds to local ADP/ODP negotiation, and local XID exchange.
7. Modem Relay session is connected after both sides are finished with XID exchange.

It should be noted that transition to V.8 modem relay occurs only when both the originating and answerer client modems are V.8 modems. If answerer client modem is not a V.8 modem (e.g., V.32 bis or lower speed modulation), then it would not generate AnsAm, hence even if the originating client modem is a V.8 modem, it would still not generate CM. Also, if answerer client modem is a V.8 modem, but originating client modem is not a V.8 modem, there still would be no CM generated, since only a V.8 originating modem generates CM.

The problem with the local XID exchange that is part of the above-described method is that the least common denominator prevails, i.e. the XID parameters typically are default values representing low performance. For example, the default XID parameters typically negotiate V.42. bis compression with a 1 k history size and a 32 string size, which are relatively inefficient operating parameters and may produce undesirably low modem relay performance.

This is the problem addressed by the present invention, which achieves high modem relay performance via end-to-end XID negotiation.

VBD Fallback Codec

VBD fallback codec (i.e., when using VBD for non-V.8 modems) need not necessarily be the same as the standard VBD codec that is used when using VBD to handle all modem modulations (V.8 and non-V.8). For example, implementations may use ADPCM for VBD fallback codec and G.711 for standard VBD codec. G.711 codec is not necessary for VBD fallback, since V.34, V.90, and V.92 modems are handled using modem relay.

Co-existence With V.34 Fax

Above call discrimination approach can be easily integrated to support V.34 fax, either in VBD or in "fax relay mode."

In case of V.34 fax, the originating fax machine would generate one of the patterns associated with "fax CM." This means V.34 faxes can be discriminated from V.8 modems, and V.34 fax transmission would not result in a switch-over to V.8 modem relay.

To support V.34 fax in VBD mode, detection of "fax CM" can be ignored, which would leave the channel in VBD mode.

To support V.34 fax using "fax relay", upon detection of the "fax CM" Originating Gateway switches over to "fax relay" and sends event to Terminating Gateway to do the same.

This means the modem call discrimination would not interfere with support for fax, which can be using VBD or "fax relay" as desired by the gateways.

V.8 Modem Relay With Sequential Link Bring-up (SLB)

SLB in accordance with the present invention allows "end-to-end" XID negotiation. Using this invented procedure, "non-default" compression parameters can be supported by Link Layer gateways. Also, unnecessary compression transcoding is avoided by uni-directional or bi-directional Compression Layer gateways. SLB allows end-to-end XID negotiation to be performed without requiring "synchronized" (simultaneous) bring-up of physical layers or ADP/ODP negotiation. SLB procedure relies on "sequential" instead of "synchronized" bring-up of physical layers on the two gateways as shown in FIGS. 3A, 3B and 4.

V.8 Modem Relay With SLB Type 1

Figure 3A:
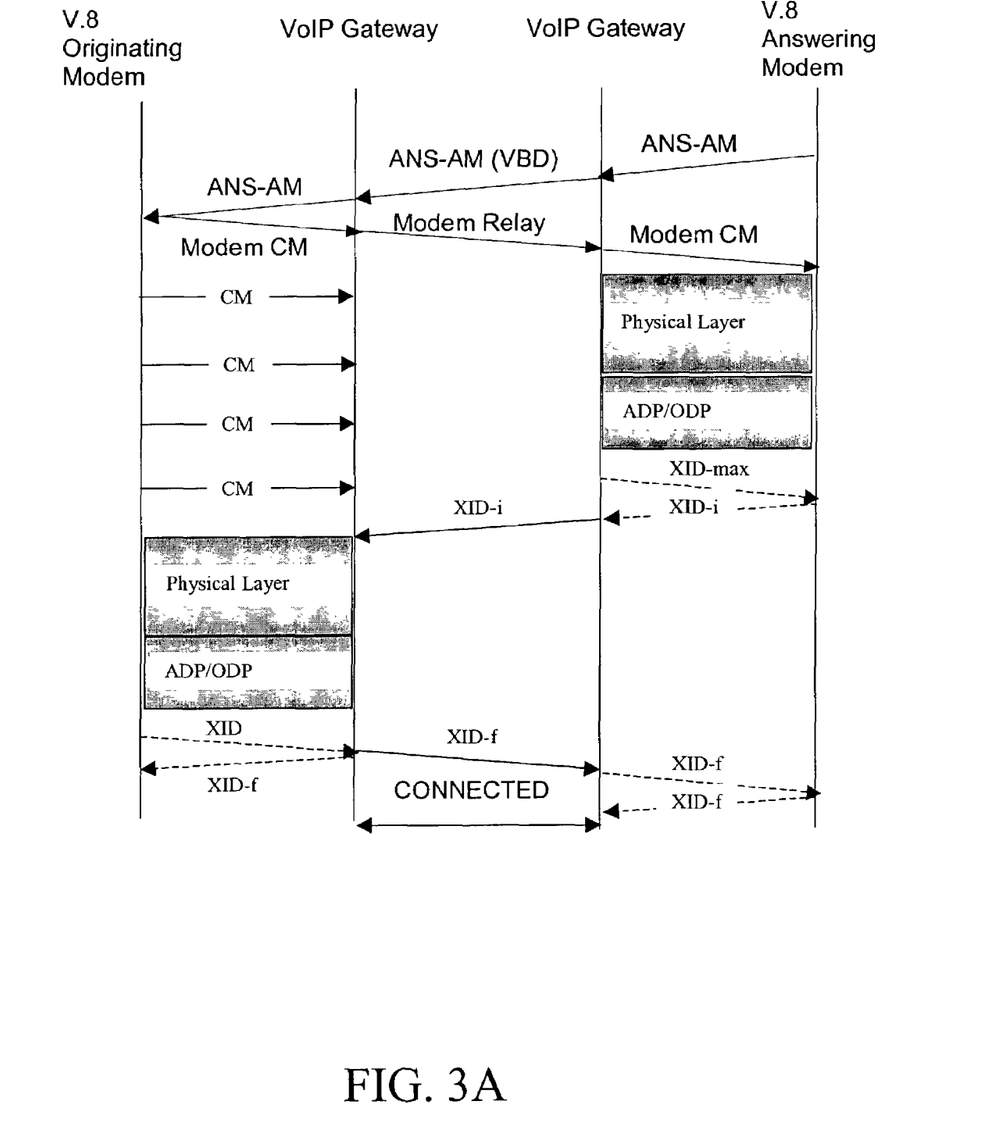
FIGS. 3A and 3B are flow diagrams of the invented method in accordance with a first embodiment and an alternative first embodiment.
Figure 3B:
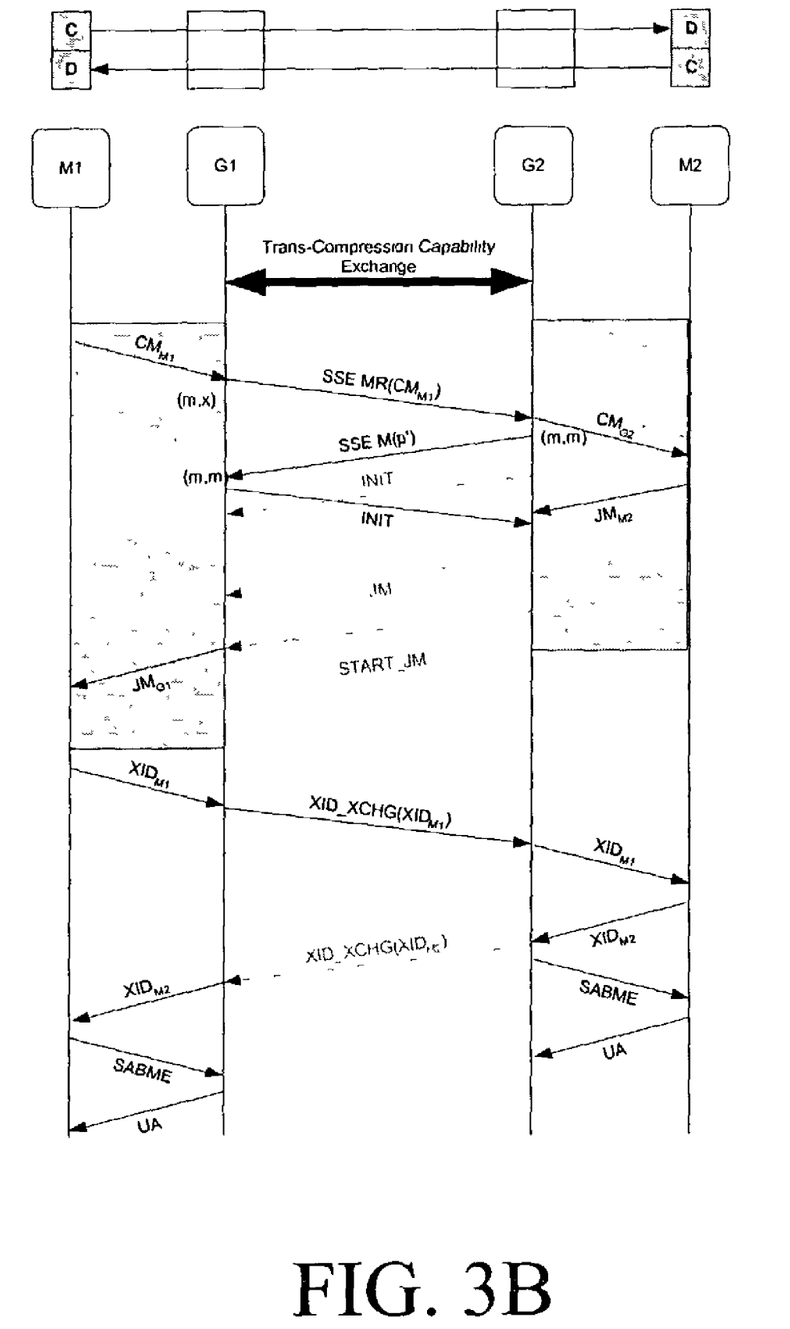
Figure 4:
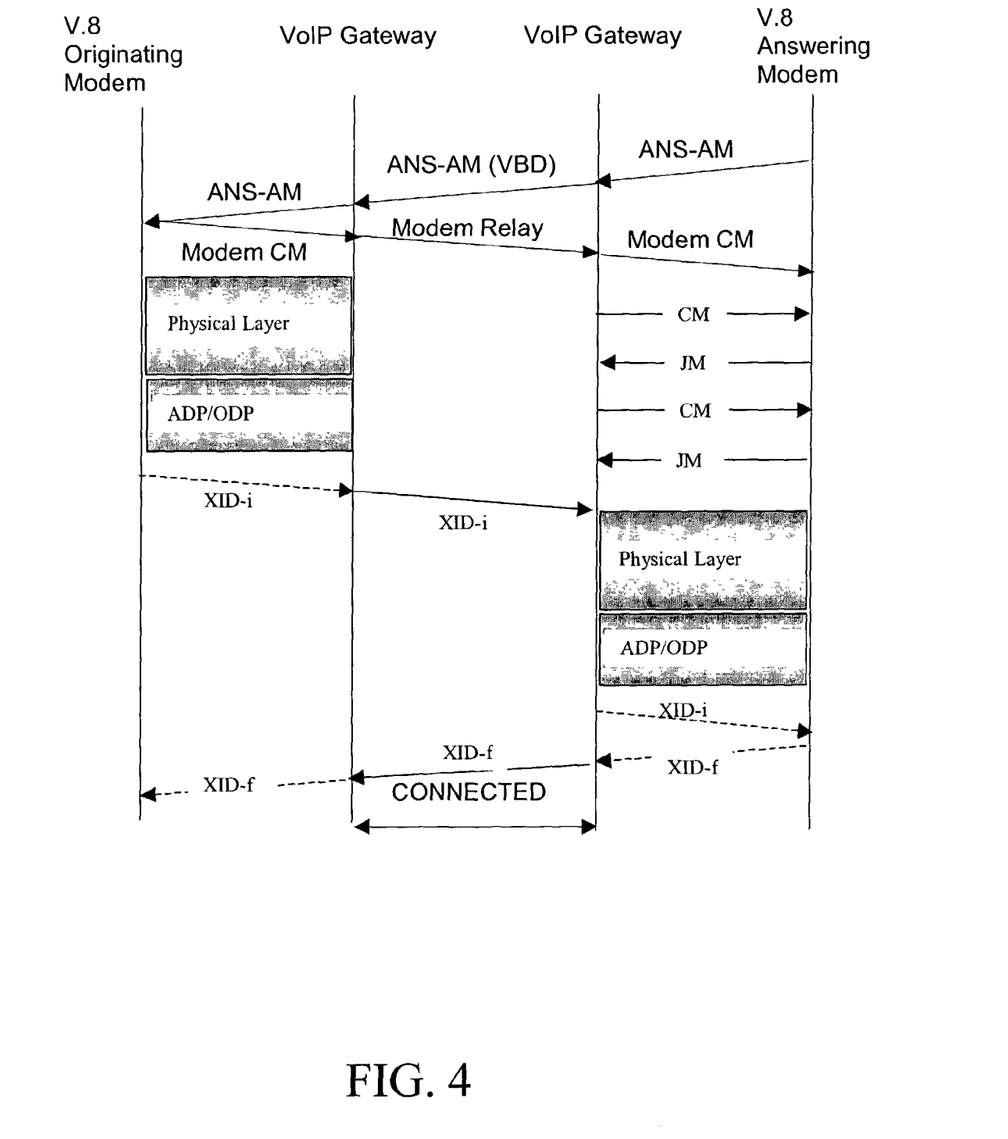
FIG. 4 is a flow diagram of the invented method in accordance with a second embodiment.

FIGS. 3A and 3B contain enhanced call flow diagrams for V.8 Modem Relay, which uses Sequential Link Bring-up.

Type 1 (SLB-1)

The bring-up procedure for V.8 modem relay with SLB Type 1 is as follows:

Step 1: Terminating Gateway detects ANSAm and switches over to Voice Band Data (VBD).
Step 2: ANSAm signal is carried over VBD to the Originating Gateway, which also switches over to VBD and sends ANSAm to Originating Client modem.
Step 3: Originating Client modem responds with "modem CM" (i.e. CM patterns indicating a data modem).
Step 4: Originating Gateway detects "modem CM".
Step 5: Originating Gateway sends "modem relay" event to Terminating Gateway indicating "modem CM" has been detected, but delays before proceeding with physical layer bring up until the physical layer bring-up/initial XID negotiation is complete on the Terminating Gateway.

Preferably, in accordance with the invention, such an Originating Gateway stall or delay is achieved by the Originating Gateway ignoring the CM it receives from the originating end-device, e.g. the originating modem, and responds back not with JM but instead with silence or answer (ANS) tone. The purpose of this 'ignore-CM' stall is to delay bring-up of the originating leg.

Those of skill in the art will appreciate that such an Originating Gateway delay preferably is variable, and preferably is configured by the Originating Gateway host. It may, for example, vary between zero and the time required to bring up the terminating leg physical layer, depending upon the application. In accordance with one embodiment of the invention, an eight second timeout establishes a maximum value for this Originating Gateway delay. In the abnormal case of time-outs or error events, JM-delay procedure is aborted upon timeout lapse, and alternative bring-up proceeds using the default, local-XID negotiation V.8 procedure described above. This T1 timeout timer preferably is started upon detection of CM by the Originating Modem.

Those of skill in the art will appreciate that the 'on-ramp' and 'off-ramp' JM-delay procedures may be implemented by use of a Simple Packet Relay Transport (SPRT) message defined as START_JM. In this case, the Originating Gateway waits to receive the START_JM message from the Terminating Gateway before proceeding to generate JM. (The Originating Gateway may, within the spirit and scope of the invention, reserve the fall-back SLB-1-abortion and V.8-invocation posture in the event of time-outs or error events, as described above. The Terminating Gateway sends an SPRT START_JM message to the Originating Gateway. This may happen immediately or following a period after the physical layer startup of the Terminating Gateway has begun.

Step 6: The Terminating Gateway brings up the physical layer (starting with CM generation). The Terminating Gateway delays before proceeding to final XID negotiation until an XID is received from the Originating Gateway. The Terminating Gateway may perform an initial XID exchange to discover the negotiation "posture" (i.e., maximum compression capability) of the answerer client modem.

This stall or delay tactic is very different from that of the Originating Gateway. In this case, the problem is that the terminating leg is ready or nearly ready to start the error-correction layer bring-up by performing an XID exchange between the Terminating Gateway and the terminating end-device, e.g. the terminating modem. However, the XID exchange must be stalled since the XID has not yet been received from the Originating Gateway. In accordance with the invention, this Terminating Gateway stall or delay is achieved by any one of a plurality of methods, including multiple XID exchange, MP-MP' exchange, silence, retrain, rate negotiation (speed shift), modem on hold or call-waiting, modulation-based technique that stalls error-correction layer timers, or of XID deferral. These alternative methods will be described in more detail below.

Those of skill in the art will appreciate that such a Terminating Gateway delay also preferably is variable, and is preferably configured by the Terminating Gateway host. In accordance with one embodiment of the invention, a T2 timeout establishes a maximum value for this Terminating Gateway delay. This T2 timeout timer preferably is started upon detection of JM by the Terminating Gateway.

Step 7: The Originating Gateway brings up its physical layer (starting with JM generation). The Originating Gateway then proceeds to ADP/ODP, and XID negotiation. After receiving XID from originating modem, the Originating Gateway forwards this XID to the Terminating Gateway, which then proceeds with its final XID negotiation.

Step 8: Modem Relay session is connected after both sides are finished with XID exchange.

If "no protocol" is negotiated with either client modem (e.g, ADP/ODP negotiation for V.42 failed), the corresponding gateway sources the XID packet on behalf of its client modem. The XID packet sourced would indicate that compression is off. This is why the XID negotiation between a gateway and its client modem is shown in dashed lines in FIG. 3A, since the local XID negotiation would only be applicable for V.42 operation on that leg.

The XID exchange portion of SLB-1 bring-up, in accordance with one embodiment, may now be briefly summarized.

Referring briefly to FIG. 3A, at the terminating leg, in accordance with 'off-ramp' gateway procedures, the Terminating Gateway sends an XID-max probe to its local Terminating Client modem and awaits an XID-I response therefrom, which it forwards to the Originating Gateway. After the originating leg is brought up, the Originating Client modem sends an XID to its associated Originating Gateway. The Originating Gateway sends an XID-f to the Terminating Gateway, while immediately responding to the Originating Client modem with XID-f. When the Terminating Gateway receives XID-f, it forwards it to its local Terminating Client modem, which responds in kind to complete the MoIP connection.

The XID exchange portion of SLB-1 bring-up, in accordance with the alternative embodiment, may now be briefly summarized.

Referring briefly to FIG. 3B, at the originating leg, in accordance with 'on-ramp' gateway procedures, the Originating Gateway waits to receive an XID message from its local modem. After receiving the XID message from its local modem, the Originating Gateway sends to the Terminating Gateway an XID message containing the compression parameters that the Originating Gateway received from its local modem. After forwarding the XID message XID-i, the Originating Gateway waits for an XID message XID-f from the Terminating Gateway. After receiving the XID message XID from the Terminating Gateway, the Originating Gateway uses such received XID parameters to complete XID negotiation with its local modem on the originating ('on-ramp') leg.

(The difference between the XID exchange illustrated in FIGS. 3A and 3B represents a minor variation, with that illustrated in FIG. 3A representing an enhancement that involves exchange of XID-max and the response XID-i on the Terminating Gateway, as shown. The purpose of this enhancement is to save time by notifying the Originating Gateway with XID-i. Then when the originating leg is brought up, the originating modem sends XID to the Originating Gateway, which immediately responds with XID-f. This avoids a trans-IP network round trip otherwise required to forward XID-f to the Terminating Gateway and awaiting a response therefrom, thus saving a few hundred milliseconds typically. This enhancement, illustrated in FIG. 3A, will be referred to herein as an XID-max discovery probe.)

At the terminating leg, in accordance with 'off-ramp' gateway procedures, the Terminating Gateway waits for an XID message from the Originating Gateway. After receiving the XID message from the Originating Gateway, the Terminating Gateway uses the received XID message to negotiate compression parameters with its local modem. Upon completion of this local XID negotiation, the Terminating Gateway transmits to the Originating Gateway an XID message, wherein the XID message comprehends the negotiation outcome on the terminating ('off-ramp') leg.

V.8 Modem Relay With SLB Type 2

FIG. 4 contains an enhanced call flow diagram for V.8 Modem Relay, which uses Sequential Link Bring-up Type 2 (SLB-2).

The bring-up procedure for V.8 modem relay with SLB Type 2 is as follows:

Step 1: The Terminating Gateway detects ANSAm and switches over to Voice Band Data (VBD).

Step 2: ANSAm signal is carried over VBD to the Originating Gateway, which also switches over to VBD and sends ANSAm to the originating (client) modem.

Step 3: The Originating Client modem responds with "modem CM" (i.e., CM patterns indicating a data modem).

Step 4: The Originating Gateway detects "modem CM".

Step 5: The Originating Gateway sends "modem relay" event to the Terminating Gateway indicating "modem CM" has been detected, and proceeds with the rest of physical layer bring up, followed by ADP/ODP exchange. Upon receipt of an XID packet (XID-i) from the originating modem, the Originating Gateway forwards this to the Terminating Gateway.

Step 6: The Terminating Gateway proceeds to CM generation, but ignores all JM received until it has received "XID-i" message from the Originating Gateway. The Terminating Gateway then proceeds to physical layer bring-up, ADP/ODP, and XID negotiation. After XID negotiation is complete, the Terminating Gateway forwards the result of XID negotiation (i.e., XID-f) to the Originating Gateway, which then completes its XID negotiation.

Step 7: While the Terminating Gateway awaits an XID-I message from the Originating Gateway, in accordance with Step 6 described immediately above, the Originating Gateway must avoid a timeout at its associated Originating Client modem. Such a stall may be imposed by any suitable technique including, for example, rate re-negotiation, retraining, modem on hold (when available) or XID-deferral (when available).

Step 8: The modem relay (MR) session is connected after both sides are finished with XID exchange.

If "no protocol" is negotiated with either client modem (e.g, ADP/ODP negotiation for V.42 failed), the corresponding gateway sources the XID packet on behalf of its client modem. The XID packet sourced would indicate that compression is off. This is why the XID negotiation between a gateway and its client modem is shown in dashed lines in FIG. 4, since the local XID negotiation would only be applicable for V.42 operation on that leg.

Figure 5:
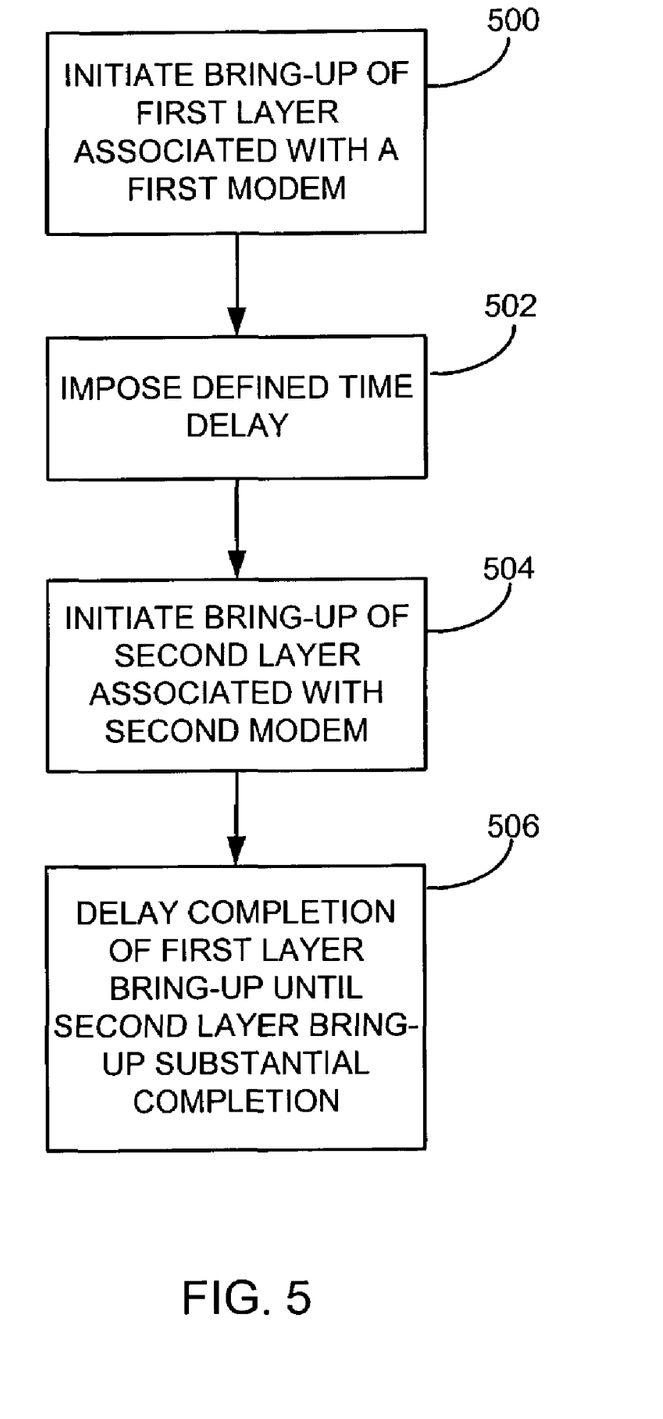
FIG. 5 is a flowchart of the invented method in accordance with a third embodiment.

FIG. 5 illustrates the invented method in accordance with a third embodiment. At 500, a bring-up of a first layer associated with a first modem is initiated. At 502, a defined time delay, or stall, is imposed. At 504, after the imposed time delay lapses, a bring-up of a second layer associated with a second modem is initiated. At 506, completion of the first layer bring-up associated with the first modem is delayed until substantial completion of the second layer bring-up associated with the second modem. The illustrated delays will be understood effectively to create a differential first and second layer modem relay link bring-up, as described more specifically in the above V.8 modem relay and V.8 SLB Type 1 and 2 bring-up examples. Preferably, the invented method further includes, after completion of a first and second physical layer bring-ups, bringing up a first and second error-correction layer associated with the first and second modems. Most preferably, the method further includes, after such first and second error-correction layer bring-up, negotiation of first and second data compression layers associated with the first and second modems. This data compression layer negotiation preferably includes one or more XID transactions, thereby achieving controlled, sequential end-to-end data compression negotiation.

ADVANTAGES

A V.8 modem relay with fallback to VBD allows for a simple transition procedure that can be adapted to support low-speed and high-speed modem and fax traffic. Sequential Link Bring-up (SLB) allows Link Layer MoIP gateways to support end-to-end XID negotiation, which provides several significant advantages:

a) Does not require simultaneous bring-up of physical layer (difficult to do with the resolution necessary for end-to-end ADP/ODP or XID negotiation).

b) Allows Uni- or Bi-Directional Compression Layer gateways to equalize compression parameters across the two telephony legs, which eliminates the need for unnecessary compression transcoding for V.8 modem connections.

c) Does not require use of default compression parameters, which allows Link Layer gateways to support V.44 compression.

d) When either client modems (originator or answerer) has not negotiated V.42 or V.42 bis/V.44 operation resulting in no compression (i.e. either "no protocol" or "V.42 with compression off"), SLB allows enforcing "no compression" on both gateway/client pairs. This allows a Link Layer gateway to not perform compression transcoding of any kind, and still to support all scenarios including V.44 or "no-compression" cases.

In SLB-1, on terminating gateway after XID-i is received, the gateway could keep the telephony link alive by introducing retrains or any other link layer or modulation layer techniques as appropriate (i.e., so client modem error-correction layer timers would not time out). For example, one way to do this is force a retrain and then keep generating INFO0a, INFO0c, or INFO0d, sequences as appropriate (which can be used to generate a very long retrain time if needed).

Other techniques include multiple XID exchange whereby, after the Terminating Gateway's physical layer has completed but no XID message has yet been received from the Originating Gateway (due to the imposed stall on the originating leg, described in detail above), the Terminating Gateway delays further error-correction layer negotiation by exchanging multiple (dummy) XIDs with its local modem. Once it has received an XID message from the Originating Gateway, the Terminating Gateway exchanges a final XID with its local modem. Other techniques also include MP-MP', whereby a V.34 terminating modem increases its time-out to physical layer completion up to thirty seconds by extending the MP-MP' negotiation. This method is indicated by setting the CME bit in INFO as specified in the V.34 standard. The MP-MP' negotiation is completed upon the earlier of XID message receipt from the Originating modem or the thirty-second timer expiration.

In SLB-2, on originating gateway after receiving XID-i, the gateway could keep the telephony leg alive by any suitable technique including, for example, rate re-negotiation, retraining, modem on hold (when available) or XID-deferral (when available).

This allows a error-correction layer gateway to achieve optimal compression setting for the MoIP connection, including V.44 if both modems support it. It does so without requiring any compression transcoding to occur on the gateway (so it represents a small-footprints solution). In addition it provides the basis to support "no compression" (e.g., no V.42bis or V.44), "no protocol" (e.g., no V.42) cases without performing compression transcoding (by enforcing no-compression on both client modems).

Those of skill in the art will appreciate that, with V.90 or V.92 modems, a modem on hold option is available in which the modem is placed on hold, thus rendering the physical layer temporarily unavailable. All modems respond to the unavailability of the physical layer by automatically stalling. Thus, in the case of a V.90 or V.92 modem, modem on hold can be invoked to produce the desired bring-up stall, thereby achieving differential link bring-up. In the case of a V.34, the MP-MP' exchange can be used to stall completion of the physical layer bring-up. An important feature of the invention involves stalling completion of the bring-up of either telephony leg. ADP/ODP exchange on each physical layer is done immediately after that particular layer is up. This ensures against missing the limited window of opportunity for ADP/ODP exchange (only a few hundred milliseconds).

Finally, those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A method comprising:
receiving a call request for a call extending from an originating modem, through an originating gateway and a terminating gateway, and to a terminating modem;
initiating a bring-up of a first physical layer associated with the terminating modem at the terminating gateway before a delayed bring-up of a second physical layer associated with the originating modem occurs at the originating gateway;
initiating an exchange identifier negotiation with the terminating modem for identifying a compression capability of the terminating modem;
stalling completion of the exchange identifier negotiation with the terminating modem after identifying the compression capability of the terminating modem;
sending the identified compression capability of the terminating modem to the originating gateway;
completing the exchange identifier negotiation with the terminating modem only after receiving a compression capability of the originating modem from the originating gateway; and
establishing a modem relay session after completing the exchange identifier negotiation between the terminating gateway and the terminating modem.

2. The method of claim 1, completing the exchange identifier negotiation between the terminating gateway and the terminating modem according to the received compression capabilities of the originating and terminating modems thereby providing end-to-end eXchange IDentification (XID) negotiation for the established modem relay session.

3. The method of claim 2, further comprising the terminating gateway stalling completion of the exchange identifier negotiation by sending one or more stalling communications to the terminating modem.

4. The method of claim 2 further comprising the terminating gateway stalling completion of the exchange identifier negotiation using silence.

5. The method of claim 2, wherein the exchange identifier negotiation includes one or more XID transactions.

6. The method of claim 1 further comprising forwarding a received XID-final message to the terminating modem immediately after receiving the compression capability of the originating modem.

7. The method of claim 1, wherein said stalling includes invoking a retrain session.

8. The method of claim 1, wherein said stalling includes initiating a speed shift.

9. The method of claim 1, wherein said stalling includes not sending plural XID transactions for a defined period of time.

10. The method of claim 1 in which the terminating modem is V.90 or V.92 type, wherein said stalling includes placing the terminating modem on hold.

11. The method of claim 1, wherein said stalling includes sending plural XID transactions.

12. A sequential V.8 modem relay link bring-up method utilizing a first modem and a second modem, the method comprising:

bringing up a physical layer at the second modem;
bringing up an error-correction layer at the second modem;
sending the first modem an eXchange IDentification (XID) query to trigger the bring-up of a physical layer and error-correction layer at the first modem; and
receiving at the second modem an XID response from the first modem;
in which the first modem sends one or more CM transactions to a gateway associated with the first modem in response to which the gateway imposes a time delay before sending one or more Joint Menu (JM) transactions to the first modem.

13. The method of claim 12 wherein the imposed time delay is configurable with a maximum of eight seconds.

14. An apparatus comprising:
one or more processors; and
a memory coupled to the processors comprising instructions executable by the processors, the processors operable when executing the instructions to:
initiate a bring-up of a physical layer at a terminating gateway located in a terminating leg of a call;
initiate an exchange identifier negotiation between the terminating gateway and a terminating modem that is also located in the terminating leg of the call;
delay completion of the exchange identifier negotiation between the terminating gateway and the terminating modem;
complete the delayed exchange identifier negotiation between the terminating gateway and the terminating modem in response to receiving an exchange identifier associated with an originating modem located in an originating leg of the call; and
establish a modem relay session.

15. The apparatus of claim 14, wherein the terminating gateway initiates the exchange identifier negotiation before the originating gateway initiates a delayed eXchange IDentification (XID) negotiation with the originating modem and the terminating gateway completes the exchange identifier negotiation after the originating gateway completes the XID negotiation with the originating modem.

16. The apparatus of claim 14, wherein the processors are further operable to process a modem speed shift for delaying completion of the exchange identifier negotiation between the terminating gateway and the terminating modem.

17. The apparatus of claim 14, wherein no XID transactions are sent by the terminating gateway for a defined period of time to delay completion of the exchange identifier negotiation.

18. The apparatus of claim 14 in which one or more of the originating and terminating modems are V.90 or V.92 type, wherein the processors are further operable to put the terminating modem on hold to delay completion of the exchange identifier negotiation between the terminating gateway and the terminating modem.

19. The apparatus of claim 14, wherein the processors are further operable to send delaying XID transactions to the terminating modem to delay completion of the exchange identifier negotiation between the terminating gateway and the terminating modem.

20. The apparatus of claim 14, wherein the processors are further operable to conduct V.34 extended MP-MP' exchanges to delay completion of the exchange identifier negotiation between the terminating gateway and the terminating modem.

21. The apparatus of claim 14 wherein the exchange identifier negotiation is an eXchange IDentification (XID) negotiation.

22. An apparatus, comprising:
one or more processors; and
a memory coupled to the processors comprising instructions executable by the processors, the processors operable when executing the instructions to:
bring up a physical layer at a first modem;
bring up an error-correction layer at the first modem;
communicate to a second modem an eXchange IDentification (XID) query to trigger bring-up of a physical layer and an error-correction layer at the second modem; and
receive an XID response from the second modem for communicating to the first modem;
wherein the processors are further operable to impose a time delay for delaying provision of a Joint Menu (JM) by a gateway in response to receiving a Call Menu (CM) query from the first modem.

23. The apparatus of claim 22 wherein the processors are further operable to access a configuration setting to determine a duration of the imposed time delay.

24. The apparatus of claim 23 wherein the configuration setting includes a maximum setting of eight seconds.

25. An apparatus comprising:
means for initiating a delayed bring-up of a physical layer at an originating gateway located in an originating leg of a call until an exchange identifier for a terminating modem is received;
means for bringing up the physical layer in response to receiving the exchange identifier for the terminating modem;
means for negotiating an exchange identifier for an originating modem according to the received exchange identifier for the terminating modem;
means for sending a message to elicit a terminating gateway to complete exchange identifier negotiation with the terminating modem; and
means for establishing a modem relay session after sending the message;
wherein the originating gateway initiates eXchange IDentification (XID) negotiation with the originating modem after the terminating gateway initiates XID negotiation with the terminating modem and the originating gateway completes XID negotiation with the originating modem before the terminating gateway reaches delayed XID negotiation completion.

26. The apparatus of claim 25, wherein said means for initiating a delayed bring-up of the physical layer includes means for delaying a local Joint Menu (JM) response to a Call Menu (CM) query from the originating modem.

27. A system comprising:
an originating gateway configured to delay bringing up a physical layer for connection with an originating modem until after receiving a first compression capability of a terminating modem; and
a terminating gateway configured to delay completing exchange identifier negotiation with a terminating modem until after receiving a second compression capability of the originating modem;
wherein end-to-end eXchange Identification (XID) negotiation is performed between the originating and terminating modems;
wherein the originating gateway is configured to establish a transfer with the originating modem according to the first compression capability of the terminating modem and independently of any default compression capabilities.

28. The system of claim 27 wherein the terminating gateway is configured to establish a transfer with the terminating modem according to the second compression capability of the originating modem and independently of any default compression capabilities.

29. A system, comprising:
an originating gateway configured to delay bringing up a physical layer for connection with an originating modem until after receiving a first compression capability of a terminating modem; and
a terminating gateway configured to delay completing exchange identifier negotiation with a terminating modem until after receiving a second compression capability of the originating modem;
wherein the terminating gateway is configured to establish a transfer with the terminating modem according to the second compression capability of the originating modem and independently of any default compression capabilities.

30. The system of claim 29 wherein end-to-end eXchange IDentification (XID) negotiation is performed between the originating and terminating modems.

31. The system of claim 29 wherein the originating gateway is configured to establish a transfer with the originating modem according to the first compression capability of the terminating modem and independently of any default compression capabilities.

32. An apparatus, comprising:
one or more processors; and
a memory coupled to the processors comprising instructions executable by the processors, the processors operable when executing the instructions to:
initiate a delayed bring-up of a physical layer at an originating gateway located in an originating leg of a call until an exchange identifier for a terminating modem is received;
bring up the physical layer in response to receiving the exchange identifier for the terminating modem;
negotiate an exchange identifier for an originating modem according to the received exchange identifier for the terminating modem;
send a message to elicit a terminating gateway to complete exchange identifier negotiation with the terminating modem; and
establish a modem relay session after sending the message;
wherein the originating gateway initiates exchange identifier negotiation with the originating modem after the terminating gateway initiates exchange identifier negotiation with the terminating modem and the originating gateway completes exchange identifier negotiation with the originating modem before the terminating gateway reaches delayed exchange identifier negotiation completion.

33. The apparatus of claim 32 wherein the processors are further operable to delay sending a local Joint Menu (JM) response to a Call Menu (CM) query from the originating modem.

34. The apparatus of claim 32 wherein the exchange identifier negotiation initiated by the originating gateway is eXchange IDentification (XID) negotiation.

* * * * *